United States Patent
Ozawa et al.

(10) Patent No.: US 6,883,589 B2
(45) Date of Patent: Apr. 26, 2005

(54) FRONT END STRUCTURE

(75) Inventors: Ikuo Ozawa, Toyoake (JP); Toshiki Sugiyama, Kariya (JP); Norihisa Sasano, Ama-gun (JP); Noriaki Maeda, Kariya (JP); Shun Kurata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/964,100

(22) Filed: Sep. 26, 2001

(65) Prior Publication Data

US 2002/0014322 A1 Feb. 7, 2002

Related U.S. Application Data

(63) Continuation of application No. PCT/JP01/00681, filed on Jan. 31, 2001.

(30) Foreign Application Priority Data

| Jan. 31, 2000 | (JP) | 2000-027271 |
| Oct. 3, 2000 | (JP) | 2000-303584 |
| Nov. 30, 2000 | (JP) | 2000-365237 |

(51) Int. Cl.$^7$ .................... B60K 11/00; B60H 1/00
(52) U.S. Cl. ............. 165/41; 165/122; 180/68.1; 180/68.4; 248/232
(58) Field of Search ................. 165/41, 51, 122, 165/148, 152, 153, 68.1, 68.4; 248/232; 123/41.01, 41.51; 180/68.4, 68.1

(56) References Cited

U.S. PATENT DOCUMENTS

| 3,978,938 A | * | 9/1976 | Joscher et al. | |
| 4,287,961 A | * | 9/1981 | Steiger | |
| 4,566,407 A | * | 1/1986 | Peter | 180/68.4 X |
| 4,651,816 A | * | 3/1987 | Struss et al. | 180/68.4 X |
| 4,821,828 A | * | 4/1989 | Schwerzler et al. | 180/68.4 |
| 4,914,929 A | * | 4/1990 | Shimazaki, Seiji | |
| 4,938,303 A | * | 7/1990 | Schaal et al. | 180/68.4 X |
| 4,979,584 A | * | 12/1990 | Charles | 180/68.1 |
| 5,123,695 A | * | 6/1992 | Kanemitsu et al. | 180/68.4 X |
| 5,219,016 A | * | 6/1993 | Bolton et al. | 165/41 |

(Continued)

FOREIGN PATENT DOCUMENTS

| DE | 31 50 152 A1 | 6/1983 | |
| DE | 36 30 646 C1 | 7/1987 | |
| DE | 198 43 928 | 4/1999 | |
| DE | 198 31 256 | 1/2000 | |
| EP | 0 487 098 | 5/1992 | |
| FR | 98 06407 | 11/1999 | |
| JP | U-63-158420 | 10/1988 | |
| JP | A-1-109182 | 4/1989 | |
| JP | 3-193554 | * 8/1991 | 165/41 |
| JP | 5-71891 | 3/1993 | |
| JP | 5-99583 | * 4/1993 | 165/41 |
| JP | A-11-129935 | 5/1999 | |
| JP | A-11-321346 | 11/1999 | |
| JP | 11-321347 | 11/1999 | |

Primary Examiner—Ljiljana Ciric
(74) Attorney, Agent, or Firm—Harness, Dickey & Pierce, PLC

(57) ABSTRACT

A front end structure includes a front end panel (400) that is configured as a duct structure for preventing the air introduced from a grille opening (452) from bypassing a condenser (200) and a radiator (100). A fan unit (300) is arranged on the most upstream side portion of the structure. As a result, without the need to provide parts making up a separate duct structure, fresh air flow temperature can be blown in, while at the same time, the air that has passed through the condenser (200) can be prevented from bypassing the radiator (100). Thus, the heat releasing capacity of the condenser (200) and the radiator (100) can be improved while simultaneously preventing leakage between the condenser (200) and the radiator (100) without adding complex structure.

6 Claims, 3 Drawing Sheets

U.S. PATENT DOCUMENTS

| | | | |
|---|---|---|---|
| 5,269,367 A | 12/1993 | Susa et al. ...................... 165/41 |
| 5,476,138 A * | 12/1995 | Iwasaki et al. ............... 165/41 |
| 5,588,482 A * | 12/1996 | Holka ...................... 165/41 X |
| 5,597,047 A * | 1/1997 | Thompson et al. ......... 180/68.4 |
| 5,671,803 A * | 9/1997 | Tepas et al. .................. 165/41 |
| 5,901,786 A * | 5/1999 | Patel et al. ............... 165/41 X |
| 5,931,228 A * | 8/1999 | Kalbacher et al. ......... 165/51 X |
| 5,947,189 A * | 9/1999 | Takeuchi et al. ............... 165/51 |
| 6,041,744 A | 3/2000 | Oota et al. |
| 6,073,594 A * | 6/2000 | Tsukiana et al. ........ 180/68.4 X |
| 6,155,335 A * | 12/2000 | Acre et al. ...................... 165/41 |
| 6,189,958 B1 * | 2/2001 | Guyomard et al. .... 180/68.4 X |
| 6,196,624 B1 * | 3/2001 | Bierjon et al. ......... 180/68.4 X |
| 6,216,778 B1 * | 4/2001 | Corwin et al. ............. 165/41 X |
| 6,260,609 B1 * | 7/2001 | Takahashi ............... 180/68.4 X |
| 6,298,906 B1 * | 10/2001 | Vize ...................... 165/122 X |
| 6,318,450 B1 * | 11/2001 | Acre ...................... 180/68.4 X |
| 6,347,823 B1 * | 2/2002 | Ozawa et al. |
| 6,364,403 B1 | 4/2002 | Ozawa et al. |
| 6,382,312 B1 * | 5/2002 | Avequin et al. ......... 180/68.4 X |
| 6,386,273 B1 * | 5/2002 | Hateley ..................... 165/69 X |
| 6,450,276 B1 * | 9/2002 | Latcau ...................... 180/68.4 |
| 6,470,961 B1 * | 10/2002 | Case ...................... 180/68.4 X |
| 6,502,653 B1 * | 1/2003 | Balzer et al. ............... 180/68.4 |
| 6,508,506 B1 * | 1/2003 | Ozawa et al. |
| 6,516,906 B1 * | 2/2003 | Sasano et al. ............. 180/68.4 |
| 6,540,037 B1 * | 4/2003 | Sasano et al. ............. 180/68.1 |
| 6,540,284 B1 * | 4/2003 | Miyata ................. 180/68.4 X |
| 6,578,650 B1 * | 6/2003 | Ozawa et al. .......... 180/68.4 X |
| 6,626,483 B1 | 9/2003 | Ozawa et al. |
| 6,648,399 B1 | 11/2003 | Ozawa et al. |
| 6,676,283 B1 | 1/2004 | Ozawa et al. |
| 6,705,387 B1 | 3/2004 | Kokubunji et al. |
| 6,708,790 B1 | 3/2004 | Ozawa et al. |
| 2001/0050160 A1 | 12/2001 | Ozawa et al. |
| 2003/0041995 A1 | 3/2003 | Nagasaka et al. |
| 2003/0051858 A1 | 3/2003 | Sasano et al. |
| 2003/0160477 A1 | 8/2003 | Sasano et al. |
| 2003/0168270 A1 | 9/2003 | Maeda et al. |
| 2003/0168886 A1 | 9/2003 | Ozawa et al. |
| 2003/0193207 A1 | 10/2003 | Ito et al. |
| 2003/0236337 A1 | 12/2003 | Nagata et al. |
| 2004/0025813 A1 | 2/2004 | Sasano et al. |
| 2004/0035551 A1 | 2/2004 | Tamura et al. |

* cited by examiner

FRONT END STRUCTURE

CROSS-REFERENCE TO RELATED APPLICATIONS

This application is based upon and claims priority from Japanese Patent Application No. 2000-027271, filed Jan. 31, 2000, No. 2000-303584, filed Oct. 3, 2000 and No. 2000-365237, filed Nov. 30, 2000, and is a continuation of PCT/JP01/00681, filed Jan. 31, 2001.

TECHNICAL FIELD

The present invention relates to a structure at the front end portion (front end) of an automotive vehicle on which heat exchangers such as a radiator and a condenser are mounted.

BACKGROUND ART

In a method of mounting (fixing) a condenser at the front end portion of an automotive vehicle according to the invention described in Japanese Unexamined Patent Publication No. 5-71891, a condenser supporting portion is used to constitute a duct structure portion for hermetically closing the gap between the condenser and the radiator so that the flow of the air that has passed through the condenser is prevented from bypassing the radiator.

However, since parts are required in order to make up a duct structure portion, it is difficult to reduce the number of parts and assembly steps. Also, in the case where the additional parts are assembled with a lower accuracy, sufficient hermetic sealing cannot be ensured between the condenser and the radiator, with the probable result that an increased amount of air will bypass the radiator, reducing its heat releasing capacity.

Further, in the patent publication cited above, a fan unit for sending the cooling air to the condenser and the radiator is mounted downstream of the radiator along the air flow, and therefore air comparatively high in atmospheric temperature (about 80° C. to 100° C.) is sucked in and blown. Thus, the blown air (cooling air) is low in density and the real air blowing rate is reduced, resulting in the likelihood of decreasing the heat releasing capacity of the radiator and the condenser.

DISCLOSURE OF THE INVENTION

In view of the points described above, the object of the present invention is to prevent the heat releasing capacity of the radiator from decreasing by using simple means.

In order to achieve the object described above, according to one aspect of the invention, there is provided a front end structure of an automotive vehicle comprising a front end panel (400) having assembled thereon vehicle front end parts (123) including at least a radiator (100) for cooling the engine cooling water and a heat exchanger (condenser) (200) for cooling the refrigerant circulating in a compression-type refrigerator, wherein the radiator (100) and the heat exchanger (200) are arranged in series with the air flow and fixed to the front end panel (400) including an inlet opening (452) for introducing air into an engine compartment and a duct structure (410, 420, 430) for preventing the air introduced from the inlet opening (452) from bypassing the radiator (100) and the heat exchanger (200). The front end structure further comprises a fan unit (300) arranged upstream of the radiator (100) and the heat exchanger (200) along the air flow for blowing the air toward the radiator (100) and the heat exchanger (200).

As a result, without the need to provide any parts constituting a duct structure, fresh air low in temperature can be blown, while at the same time, the air introduced from the inlet opening (452) is prevented from bypassing the radiator (100) and the heat exchanger (200). Thus, the heat releasing capacity of the radiator (100) and the heat exchanger (200) can be improved while at the same time improving the hermetic sealing between the radiator (100) and the heat exchanger (200) by simple means.

According to a second aspect of the invention, there is provided a front end structure of an automotive vehicle comprising a front end panel (400) having assembled thereon vehicle front end parts (123) including at least a radiator (100) for cooling the engine cooling water and a heat exchanger (condenser) (200) for cooling the refrigerant circulating in a compression-type refrigerator, wherein the radiator (100) and the heat exchanger (200) are arranged in series with the air flow and fixed to the front end panel (400) including an inlet opening (452) for introducing air into an engine compartment, and the radiator (100) and the heat exchanger (200) are integrated with each other through a duct structural member (110) for preventing the air introduced from the inlet opening (452) from bypassing the radiator (100) and the heat exchanger (200). The front end structure further comprises a fan unit (300) arranged upstream of the radiator (100) and the heat exchanger (200) along the air flow for blowing the air toward the radiator (100) and the heat exchanger (200).

As a result, without the need to provide parts constituting a duct structure, fresh air low in temperature can be blown, while at the same time the air introduced from the inlet opening (452) is prevented from bypassing the radiator (100) and the heat exchanger (200). Thus, the heat releasing capacity of the radiator (100) and the heat exchanger (200) can be improved while at the same time improving the hermetic sealing between the radiator (100) and the heat exchanger (200) by simple means.

The front end panel (400) may be integrally formed of resin while being fixed on the vehicle body (600) at the vehicle front end portion to constitute a vehicle structural member.

Incidentally, the reference numeral in parenthesis attached to the name of each means described above is an example indicating a corresponding specific means described later with reference to embodiments.

The present invention will be more fully understood from the following description of preferred embodiments of the invention and the accompanying drawings.

PREFERRED EMBODIMENTS FOR CARRYING OUT THE INVENTION (First Embodiment)

Figure 1:
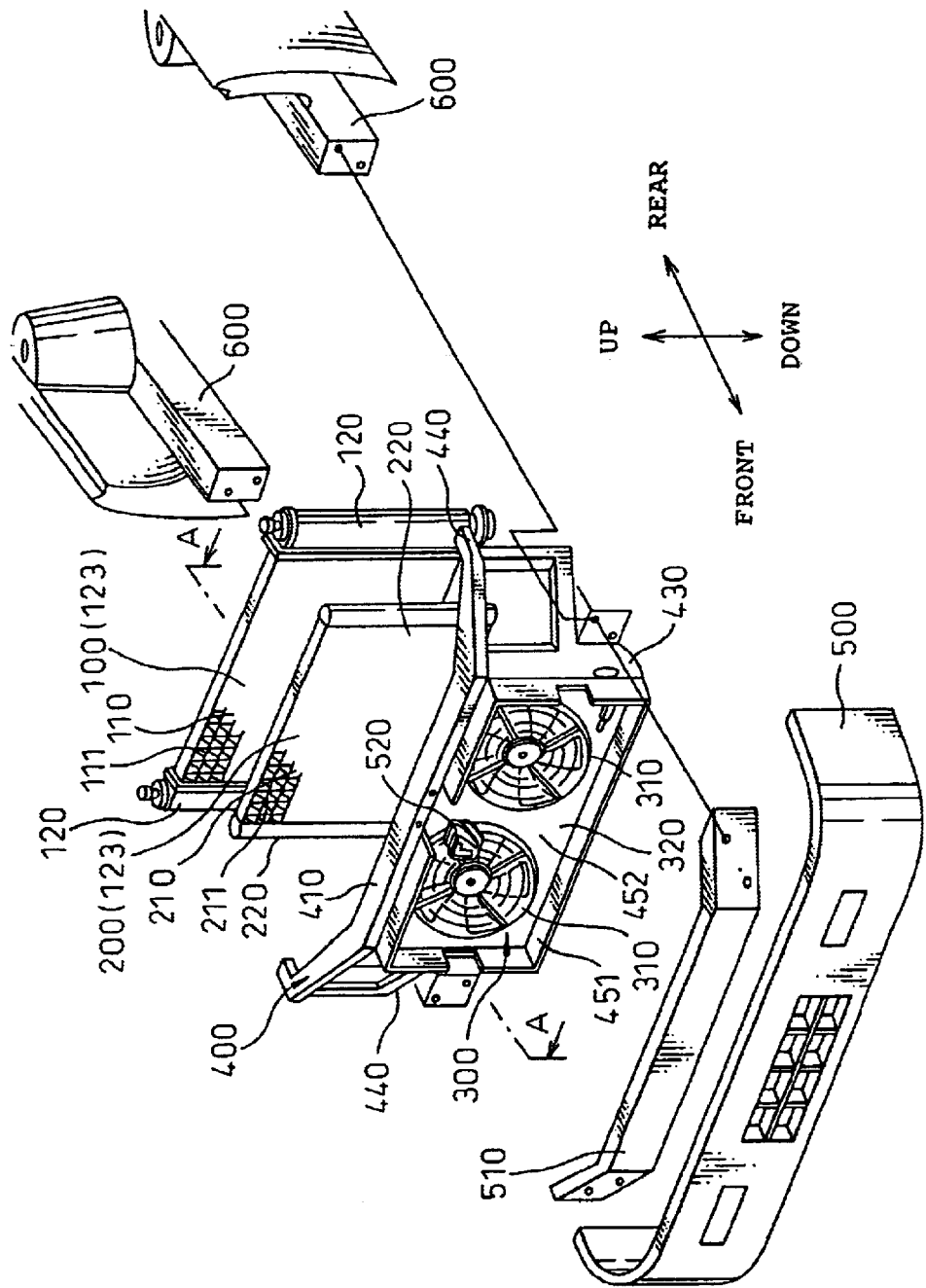
FIG. 1 is a perspective view of a front end structure according to a first embodiment of the invention.

This embodiment represents a case in which a radiator for cooling the cooling water for an engine (internal combustion engine) to drive the vehicle, a condenser for condensing by cooling the refrigerant circulating in the refrigeration cycle (air conditioning system) of the vehicle and a fan unit for blowing the cooling air to the radiator and the condenser make up the vehicle front end parts mounted on the vehicle front end portion. FIG. 1 is an exploded perspective view of a front end structure according to this embodiment.

In FIG. 1, numeral 100 designates a radiator, numeral 200 a condenser and numeral 300 a fan unit. The fan unit 300, the condenser 200 and the radiator 100 are mounted on the vehicle in that order in series from the upstream side (the vehicle front end side) along the air flow.

Figure 2:
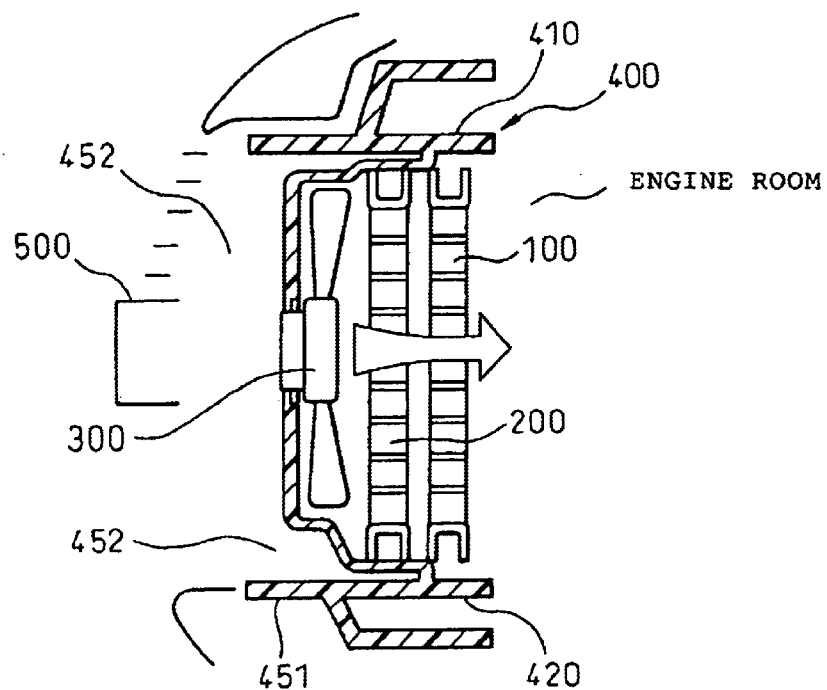
FIG. 2 is a sectional view taken in line A—A in FIG. 1.

The fan unit 300 includes axial flow fans 310 and a shroud 320 having stays 325 for holding the axial flow fans 310 while at the same time hermetically sealing the gap between the condenser 200 and the axial flow fans 310 and thus preventing the air (cooling air) blown from the fan unit 300 from bypassing the condenser 200, as shown in FIGS. 1 and 2.

The radiator 100 is a well-known heat exchanger of multi-flow type including a radiator core having a plurality of radiator tubes with the cooling water flowing therethrough and radiator tanks arranged at each of the longitudinal ends of the radiator tubes and communicating with each radiator tube.

The condenser 200, like the radiator 100, is also a well-known heat exchanger of multi-flow type including a condenser core having a plurality of condenser tubes with the refrigerant flowing therethrough and condenser tanks arranged at each of the longitudinal ends of the condenser tubes and communicating with each condenser tube.

According to this embodiment, the heat exchangers 100, 200 are mounted on the vehicle in such a manner that the tubes extend in horizontal direction and the tanks extend in vertical direction.

In this specification, the parts mounted on the vehicle front end portion including the radiator 100, the condenser 200 and the fan unit 300 are collectively referred to as the vehicle front end parts 123.

Numeral 400 designates a front end panel of resin (hereinafter referred to as the panel) with the vehicle front end parts 123 assembled fixedly thereon. The panel 400, as shown in FIGS. 1 and 2, includes an upper beam 410 arranged on the upper side and extending horizontally, a lower beam 420 arranged on the lower side and extending horizontally, and pillars 430 extending vertically for connecting the beams 410, 420.

The assembly including a rectangular frame having the beams 410, 420 and the pillars 430, and brackets 440 for fixing the panel 400 on a vehicle body 600 (FIG. 1) is called a panel body 450.

According to this embodiment, the shroud 320 is formed integrally with the front end panel 400 and so structured as to reinforce the rectangular frame having the beams 410, 420 and the pillars 430.

The portion of the panel body 450 nearer to the vehicle front end, as shown in FIG. 1, includes a picture frame-like guide duct 451 protruded toward the vehicle front end for introducing the cooling air (vehicle drive-caused wind) into the condenser 200 and the radiator 100. The guide duct 451 is integrated by resin with the panel body 450. The opening of the guide duct 451 nearer to the vehicle front end will hereinafter be referred to as the grille opening (inlet opening) 452.

The rectangular frame including the beams 410, 420 and the pillars 430, as shown in FIG. 2, makes up a duct structure whereby the air introduced from the grille opening 452 is prevented from bypassing the condenser 200 and the radiator 100.

In FIG. 1, numeral 500 designates a bumper reinforcement (hereinafter referred to as the bumper) of metal making up a buffer for the vehicle front end, numeral 510 a bumper cover of resin, and numeral 520 a bonnet lock (a hood lock for opening/closing the bonnet hood) for closing the engine compartment (not shown).

Now, the features of the invention will be described.

According to this invention, the duct structure for preventing the air introduced from the grille opening 452 from bypassing the condenser 200 and the radiator 100 is constituted of the rectangular frame including the beams 410, 420 and the pillars 430, and therefore the air that has passed through the condenser 200 can be prevented from bypassing the radiator 100 without the need to provide any parts making up a duct structure.

For this reason, the number of the parts of the vehicle front end portion and the number of assembly steps can be reduced. Without being affected by the assembly accuracy of the vehicle front end portion, therefore, the hermetic sealing between the condenser and the radiator can be easily ensured for improved heat releasing capacity on the part of the radiator.

Also, in view of the fact that the fan unit 300 is mounted upstream of the condenser 200 and the radiator 100 along the air flow, fresh air having a low atmospheric temperature can be sucked in and blown. Thus, the density of the blown air (cooling air) can be prevented from decreasing, thereby making it possible to prevent the real blowing rate from decreasing. As a result, the heat releasing capacity of the condenser 200 and the radiator 100 can be improved.

As described above, according to this embodiment, the heat releasing capacity of the condenser 200 and the radiator 100 can be improved while at the same time improving the hermetic sealing between the condenser 200 and the radiator 100 by using simple means.

When the vehicle is stationary or running at very low speed and there is substantially no vehicle motion-induced air pressure, the hot air that has passed through the radiator 100, impinges on the engine, turns downward to the lower side of the engine compartment (toward the ground surface) and circumvents to the vehicle front, is liable to pass (recirculates) through the condenser 200 and the radiator 100 again.

The recirculation of hot air reduces the heat releasing capacity of the condenser 200 and the radiator 100, thereby leading to engine overheating and reduced cooling capacity on the part of the air conditioning system.

According to the present embodiment, in contrast, in which the guide duct 451 extends toward the vehicle front, the hot air that has circumvented to the vehicle front from the lower side of the engine compartment (the ground surface side) is prevented from recirculating to the duct opening 452 (the condenser 200 and the radiator 100). In this way, the heat releasing capacity of the condenser 200 and the radiator 100 is prevented from decreasing. Thus, the engine is prevented from overheating and the cooling capacity of the air conditioning system from being reduced.

Also, the fan unit 300 is mounted upstream of the condenser 200 and the radiator 100 along the air flow, where the fan unit 300 (especially the drive means such as an electric motor for driving the axial flow fans 310) is not directly exposed to the heat radiated from the engine and the atmospheric temperature is low.

In this way, thermal damage (burning of the electric motor, etc.) to the fan unit 300 can be prevented and the structure for protecting against thermal damage to the fan unit 300 can be simplified. Thus, the size and the production cost of the fan unit 300 can be reduced, thereby making it possible to simplify and reduce the production cost of the vehicle front end portion.

Also, since the panel 400 and the shroud 320 are integrated with each other, the number of steps for assembling the vehicle front end parts 123 on the vehicle can be reduced for a lower vehicle production cost.

(Second Embodiment)

Figure 3:
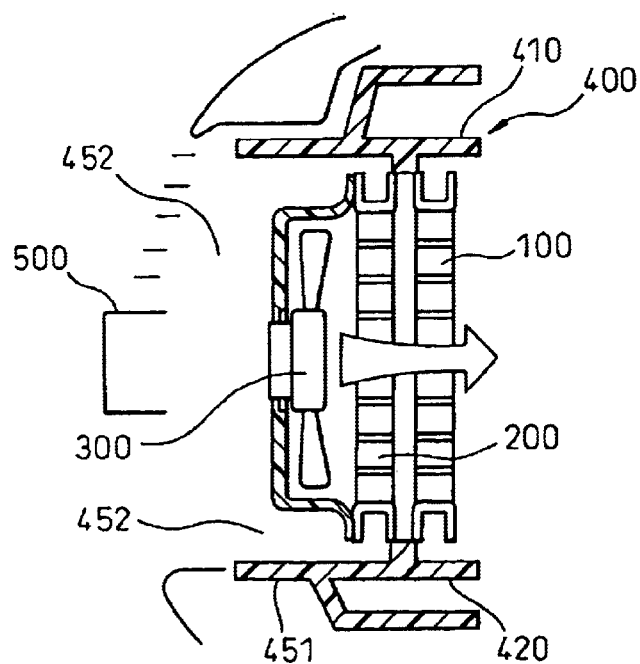
FIG. 3 is a sectional view corresponding to the sectional view taken in line A—A of FIG. 1, showing a front end structure according to a second embodiment of the invention.

According to this embodiment, unlike in the first embodiment having the panel 400 and the shroud 320 integrated with each other, the panel 400 and the shroud 320 are formed as members independent of each other and the fan unit 300 is fixedly assembled on the condenser 200 and the radiator 100 by fastening means such as a bolt, as shown in FIG. 3.

This facilitates maintenance work (repair and/or exchange) conducted on the fan unit 300 at a dealer or a service station.

(Third Embodiment)

Figure 4:
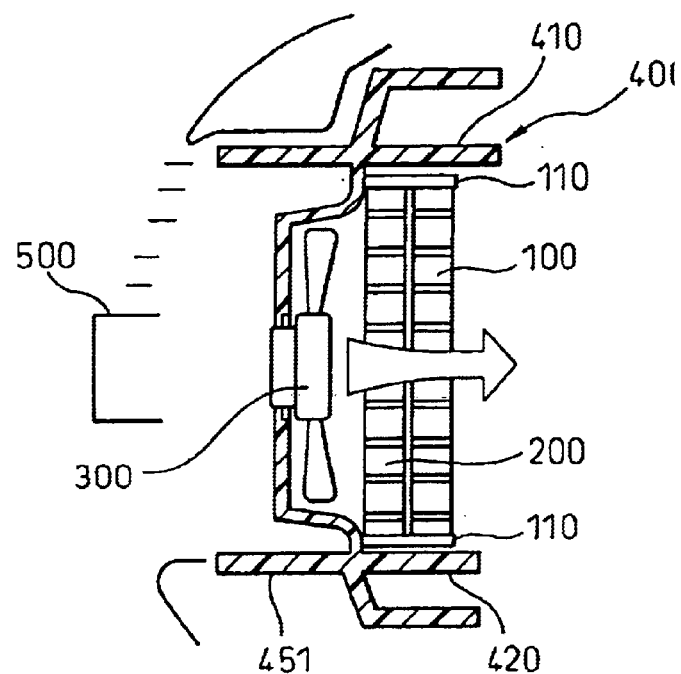
FIG. 4 is a sectional view corresponding to the sectional view taken in line A—A of FIG. 1, showing a front end structure according to a third embodiment of the invention.

According to the first and second embodiments, the condenser 200 and the radiator 100 are fixedly assembled on the panel 400 independently. In the present embodiment, on the other hand, as shown in FIG. 4, the condenser 200 and the radiator 100 are assembled on the panel 400 after being integrated with each other.

According to this embodiment, the condenser 200 and the radiator 100 are integrated with each other by side plates (brackets) 110 each making up a reinforcing member of the condenser 200 and the radiator 100. At the same time, the side plates (brackets) 110 constitute a duct structure for preventing the air introduced from the grille opening 452 from bypassing the condenser 200 and the radiator 100.

Each of the side plates 110 is arranged on an end portion of the condenser 200 and the radiator 100, both substantially rectangular, and extends in parallel to the tubes to reinforce the heat exchange core formed of the tubes and the fins.

As a result, the hermetic sealing between the condenser 200 and the radiator 100 can be improved by simple means while at the same time improving the heat releasing capacity of the condenser 200 and the radiator 100.

The present embodiment is not limited to the above-mentioned structure in which the condenser 200 and the radiator 100 are integrated with each other by the side plates 100 to constitute the duct structure member. Other means can be employed for integrating the condenser 200 and the radiator 100 and constructing the duct structure member.

(Fourth Embodiment)

Figure 5:
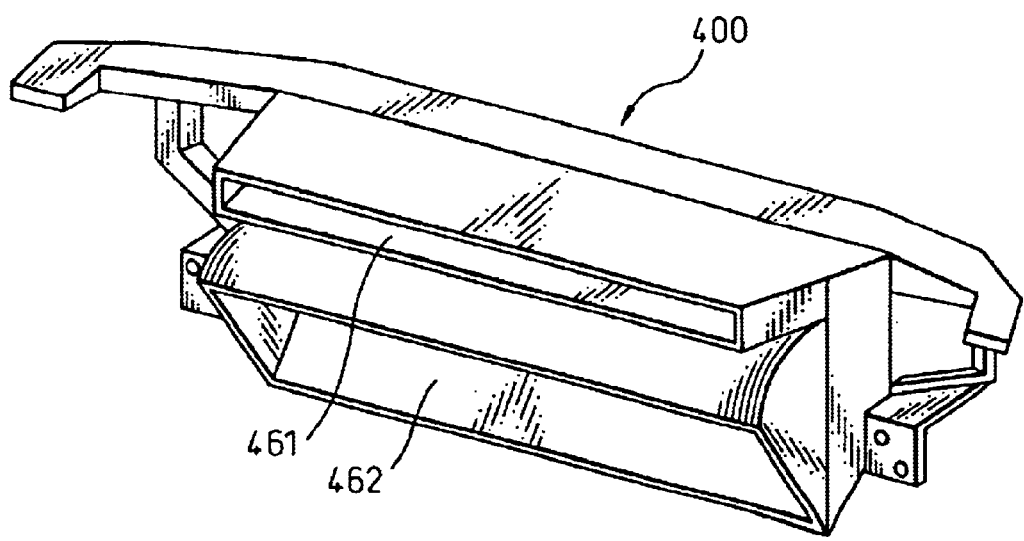
FIG. 5 is a perspective view of a front end panel of the front end structure according to a fourth embodiment of the invention.

In the first to third embodiments, the front end panel 400 is so structured that the air, that has passed through the radiator 100, is introduced into the engine compartment in its entirety. Alternatively, as shown in FIG. 5, a structure may be employed in which the air that has passed through the radiator 100 is discharged partly out of the engine compartment. Specifically, a first air path 461 for leading the air, that has passed through the radiator 100 into the engine compartment, and a second air path 462 for leading the air, that has passed through the radiator 100 out of the engine compartment, may be formed integrally on the front end panel 400, which has built therein the radiator 100, the condenser 200 and the fan unit 300 to make up a front end structure.

Embodiments of the invention have been explained above by referring to the radiator and the condenser as an example, to which the invention is, however, not limited. In place of the condenser, a heat exchanger having supercritical refrigeration cycles may be employed in which the refrigerant pressure on high pressure side of the vapor compression-type refrigeration cycles increases beyond the critical pressure of the refrigerant.

Also, the structure in which the panel body 450 is formed of resin as in the aforementioned embodiments, to which the invention is, again, not limited, may be replaced with equal effect by a structure in which the panel body 450 is formed integrally using a metal material such as aluminum or magnesium.

Although the present invention has been described above in detail with reference to specific embodiments, various changes and modifications will be obvious to those skilled in the art without departing from the scope and spirit of the invention.

What is claimed is:

1. A front end structure of an automotive vehicle having a front end and a rear end, the front end structure comprising a front end panel integrally formed from a resin and vehicle front end parts including at least a radiator for cooling engine cooling water and a heat exchanger for cooling refrigerant, the front end panel including horizontally extending beams and being adapted to be fixed to a body of the automotive vehicle, said front end panel being open towards the rear end of the automotive vehicle;

the radiator and the heat exchanger are arranged in series with respect to air flow flowing through the radiator and the heat exchanger, the radiator and the heat exchanger being directly fixed to the front end panel;

said front end panel including an inlet opening for introducing air into an engine compartment and also including a duct structure preventing the air introduced from the inlet opening from bypassing the radiator and the heat exchanger, the front end panel enclosing substantially the entire respective perimeter of each of the radiator and the heat exchanger, the duct structure including a rib extending into a gap between the front end panel and at least one of the radiator and the heat exchanger;

the front end structure further comprising a fan unit arranged upstream of the radiator and the heat exchanger with respect to the air flow for blowing the air toward the radiator and the heat exchanger; and the fan unit including a shroud and an axial flow fan, the axial flow fan being disposed in a portion of the shroud which faces the rear end of the automotive vehicle.

2. A front end structure according to claim 1, wherein the front end panel includes stays formed integrally with the front end panel for supporting the fan unit.

3. A front end structure according to claim 1, wherein said front end panel is integrally formed to define a first air path for leading the air that has passed through said radiator into the engine compartment, and a second air path for leading the air that has passed through said radiator out of the engine compartment.

4. A front end structure according to claim 1 wherein the duct structure extends further towards the front end of the vehicle than the fan unit.

5. A front end structure according to claim 1 wherein the horizontally extending beams include an upper beam disposed on an upper side of the front end panel and a lower beam disposed on a lower side of the front end panel, the front end panel further including a pair of pillars extending vertically between the upper beam and the lower beam.

6. A front end structure according to claim 1 wherein the shroud is attached directly to at least one of the radiator and the heat exchanger.

* * * * *